United States Patent
Kim et al.

(10) Patent No.: US 12,511,875 B2
(45) Date of Patent: Dec. 30, 2025

(54) APPARATUS AND METHOD FOR IDENTIFYING INSECT OBJECTS THROUGH LEARNING

(71) Applicant: FARMCONNECT CO., LTD., Daejeon-si (KR)

(72) Inventors: Mu Hyun Kim, Paju-si (KR); In Seok Jeong, Seoul (KR)

(73) Assignee: FARMCONNECT CO., LTD., Daejeon-si (KR)

( * ) Notice: Subject to any disclaimer, the term of this patent is extended or adjusted under 35 U.S.C. 154(b) by 309 days.

(21) Appl. No.: 18/342,067

(22) Filed: Jun. 27, 2023

(65) Prior Publication Data

US 2024/0273864 A1 Aug. 15, 2024

(30) Foreign Application Priority Data

Feb. 14, 2023 (KR) ........................ 10-2023-0019251

(51) Int. Cl.
*G06K 9/00* (2022.01)
*G06V 10/764* (2022.01)
*G06V 10/774* (2022.01)

(52) U.S. Cl.
CPC .......... *G06V 10/764* (2022.01); *G06V 10/774* (2022.01)

(58) Field of Classification Search
CPC .... G06V 10/82; G06V 10/764; G06V 10/454; G06V 40/10; G06V 20/52; G06V 20/70; G06V 20/10; G06V 20/20; G06V 10/56; G06V 10/774; G06V 10/7625; G06V 20/35; G06V 20/58; G06V 40/169; G06V 40/171; G06V 10/25; G06V 10/762; G06V 10/7715; G06V 10/778; G06V 10/95; G06V 20/17; G06V 20/188; G06V 20/56; G06V 10/22; G06V 10/761; G06V 10/776; G06V 10/803; G06V 20/41; G06V 20/46; G06V 20/588; G06V 10/255; G06V 10/26; G06V 10/267; G06V 10/44; G06V 10/62; G06V 10/70; G06V 10/768; G06V 10/7788;
(Continued)

(56) References Cited

U.S. PATENT DOCUMENTS

2020/0281164 A1   9/2020   Lepek et al.
2020/0349397 A1   11/2020   Criswell et al.
(Continued)

FOREIGN PATENT DOCUMENTS

CN   114219051 A   3/2022
CN   114847196 A   8/2022
(Continued)

OTHER PUBLICATIONS

Rong et al. Pest Identification and Counting of Yellow Plate in Field Based on Improved Mask R-CNN, Discrete Dynamics in Nature and Society (Year: 2022).*

(Continued)

*Primary Examiner* — Alex Kok S Liew
(74) *Attorney, Agent, or Firm* — Bridgeway IP Law Group, PLLC; Jihun Kim

(57) ABSTRACT

An apparatus and a method for identifying insect objects, particularly honeybees, bumblebees, hornets, ants, and other insects, based on their physical structures, colors, and other characteristics learned or trained through a deep learning model are proposed.

14 Claims, 16 Drawing Sheets

(58) Field of Classification Search
CPC ............... G06V 10/993; G06V 20/698; G06V 2201/07; G06V 30/2247
See application file for complete search history.

(56) References Cited

U.S. PATENT DOCUMENTS

| | | | |
|---|---|---|---|
| 2021/0073528 A1* | 3/2021 | Lagerman | G06V 40/10 |
| 2021/0386038 A1* | 12/2021 | Jurisch | A01K 11/006 |
| 2022/0183266 A1* | 6/2022 | Janssen | A01M 7/0089 |
| 2022/0358742 A1 | 11/2022 | Xu et al. | |
| 2022/0361471 A1 | 11/2022 | Patch et al. | |
| 2023/0237697 A1* | 7/2023 | Pillmann | G06V 20/56 382/103 |

FOREIGN PATENT DOCUMENTS

| | | |
|---|---|---|
| KR | 10-2016-0141224 A | 12/2016 |
| KR | 10-1963648 B1 | 4/2019 |
| KR | 10-2021-0142867 A | 11/2021 |
| KR | 20220048407 A | 4/2022 |
| KR | 10-2022-0153366 A | 11/2022 |
| WO | 2021038561 A1 | 3/2021 |
| WO | 2022211925 A1 | 10/2022 |

OTHER PUBLICATIONS

Steinbock, Lorenz, "Extended European Search Report" for EP Application No. 23180653.0, Nov. 13, 2023, EPO, Munich, Germany.

Machraoui, Ahmed Nejmedine et al., "Automatic identification and behavioral analysis of phlebotomine sand flies using trajectory features", The Visual Computer, 35, pp. 721-738, 2019.

Lee, Jaesu et al. "Development and Validation of a Deep Learning-Based Algorithm for Measuring Bee Activity Levels.", Proceedings of the Korean Institute of Information and Commucation Sciences Conference. pp. 861-862, 2022.

Marstaller, Julian et al.,"Deepbees-building and scaling convolutional neuronal nets for fast and large-scale visual monitoring of bee hives". In Proceedings of the IEEE/CVF International Conference on Computer Vision Workshops, 2019.

* cited by examiner (Normal case)
Entering the hive

APPARATUS AND METHOD FOR IDENTIFYING INSECT OBJECTS THROUGH LEARNING

CROSS-REFERENCE TO RELATED APPLICATION

This application is based on and claims priority to Korean Patent Application No. 10-2023-0019251 filed on Feb. 14, 2023, with the Korean Intellectual Property Office, the disclosure of which is incorporated herein by reference in its entirety.

TECHNICAL FIELD

The present invention relates to an apparatus and method for identifying insect objects, particularly honeybees, bumblebees, hornets, ants, and other insects, based on their physical structures, colors, and other characteristics learned or trained through a deep learning model.

BACKGROUND

Honeybees are bees used for the purpose of storing and producing honey, while bumblebees are bees used for pollination, specifically for the purpose of gathering pollen through buzz pollination.

Buzz pollination refers to the behavior of vibrating their thoracic muscles to collect pollen on their hairy bodies, which transfers pollen to the stigma of flowers.

In South Korea, there are published patents such as Korean Patent Publication No. 10-2016-0141224, "Bumblebee Management Device and Management System," published on Dec. 8, 2016, which discloses a technology that uses a sensor to detect the frequency of bumblebees entering and leaving through the hive entrance, providing information on the timing of bumblebee replacement. Another patent, Korean Patent No. 10-1963648, "Greenhouse Bumblebee Management System and Method, Bumblebee Box," published on Apr. 1, 2019, discloses a technology that uses multiple sensors to detect the direction and frequency of bumblebees entering and leaving the bumblebee box, enabling control of the opening and closing of the entrance of the bumblebee box.

However, the conventional technologies mentioned above require the installation of sensors in beehives to detect bumblebee entries, which can affect the bee's environment. Additionally, their effectiveness is limited to counting the number of bee individuals, and they do not provide information on tracking bee trajectories, analyzing bee movements for environmental changes or suitability of bee's pollination activities, or providing necessary information for beehive and greenhouse management.

Furthermore, there is a need to identify unwanted or abnormal insects such as hornets, ants, and grasshoppers that come near beehives and provide appropriate measures for maintaining optimal conditions in agricultural settings. However, the conventional technologies do not recognize or propose solutions for such situations.

DISCLOSURE OF INVENTION

Problems to be Solved by the Invention

To address the aforementioned issues, the present invention aims to provide an apparatus and method that tracks the trajectory of bees by comparing their movements captured near the beehive with trained data, determines entry and exit of bees, counts the number of entering or leaving bees, and assesses the suitability of their pollination activities by analyzing the trajectory of bees and the state of pollen collected by bees.

Moreover, the present invention aims to provide an apparatus and method having an improved algorithm that identifies and predicts target objects such as honeybees and bumblebees based on pre-trained data, as well as identifies and alerts the presence of abnormal objects such as hornets, ants, and grasshoppers.

Means for Solving the Problem

To achieve the above objectives, the apparatus and method for identifying insect objects through learning in accordance with some embodiment of the present invention includes: a storage unit that stores trained data obtained by training a deep learning model with the morphological characteristics of the target insect objects; and a control unit that identifies the target insect objects using a captured video and the stored trained data and tracks the trajectory of the identified target insect objects.

Furthermore, the deep learning model classifies the morphological characteristics of the target insect objects into at least one classes and learns the characteristics of each class.

Moreover, the control unit identifies the insect objects based on a 3D distance measurement method using the morphological characteristics of the insect objects.

Additionally, the control unit identifies the target and abnormal objects by utilizing the distance measurement results between multiple classes of the target insect objects and the morphological characteristics of the various insects stored in the storage unit.

Furthermore, when the target insect objects are honeybees and bumblebees, the deep learning model defines the abdomen sections of honeybees and bumblebees as classes and trains the distribution of patterns and colors in the abdomen sections as characteristics representing the classes.

Moreover, when the abnormal insect objects are hornets, the deep learning model defines multiple classes including the head and abdomen sections of hornets and trains the distribution of patterns and colors in the abdomen section as well as the distance between the head and abdomen sections as characteristics representing the classes.

Furthermore, when the abnormal insect objects are ants, the deep learning model defines multiple classes including the head and abdomen sections of ants and trains the shape and color distribution of the abdomen section as well as the distance between the head and abdomen sections as characteristics representing the classes.

Furthermore, when the abnormal insect objects are grasshoppers, the deep learning model defines multiple classes including the head and tail sections of grasshoppers and trains the shape of the tail section as well as the distance between the head and tail sections as characteristics representing the classes.

Additionally, the control unit corrects image distortions in the captured video caused by spatial distance using the spatial distance information and the morphological information of the insect objects.

Furthermore, the control unit defines multiple areas of different sizes centered around the entrance of the beehive in the captured video and defines insect boxes around the area where the insect objects are identified.

Moreover, the control unit distinguishes the entry and exit of insect objects based on the order of overlapping between the defined areas and the insect boxes.

Furthermore, the trained data includes data related to the morphological characteristics of pollen, and the control unit analyzes the quantity of the pollen using the captured images of the pollen and the morphological characteristics of the pollen included in the trained data.

Additionally, the control unit defines a pollen box around the identified pollen in the captured video, wherein the pollen box is defined only within the insect box of bees.

Furthermore, the trained data includes data related to the morphological characteristics of abnormal insect objects, and the control unit analyzes the presence of abnormal insect objects using the images of abnormal insect objects in the captured video and the morphological characteristics of the abnormal insect objects included in the trained data.

Furthermore, the apparatus further includes a camera unit for capturing the video and a display unit for displaying the captured video, wherein the control unit defines an object identification box around the identified object and displays it on the display unit.

Moreover, the control unit displays lines connecting between the multiple classes of the target or abnormal insects on the display unit.

Furthermore, the apparatus further includes a means for opening and closing the entrance of the beehive, wherein the control unit operates the means when the abnormal insect objects are identified.

Additionally, the control unit generates a specific signal when the abnormal insect objects are identified.

Effects of the Invention

According to the present invention, there is provided an apparatus and a method that tracks the trajectory of bees by comparing their movements captured near the beehive with trained data, determines entry and exit of bees, counts the number of entering or leaving bees, and assesses the suitability of their pollination activities by analyzing the trajectory of bees and the state of pollen collected by bees.

Furthermore, according to the present invention, there is provided an apparatus and a method having an improved algorithm that identifies and predicts target objects such as honeybees and bumblebees based on pre-trained data, as well as identifies and alerts the presence of abnormal objects such as hornets, ants, and grasshoppers.

DESCRIPTION OF THE INVENTION

Figure 1:
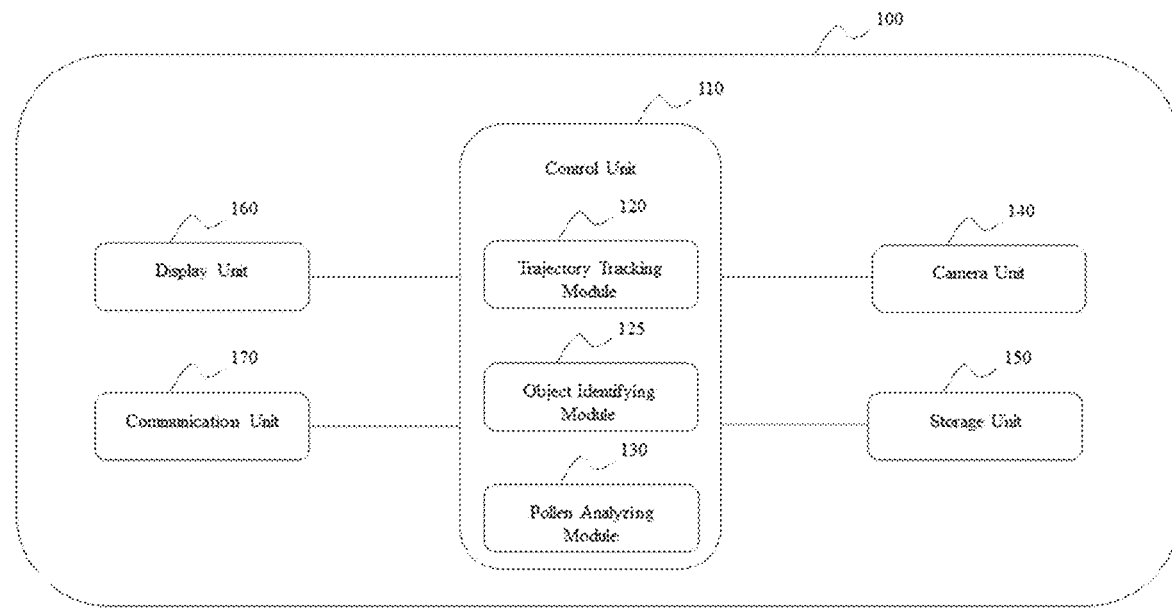
FIG. 1 is a schematic diagram illustrating the configuration of an apparatus for identifying insect objects through learning according to some embodiment of the present invention.

The advantages, features, and methods for achieving them in the present invention will be clearly understood by referring to the detailed explanation of the embodiments provided with the accompanying drawings. However, the present invention is not limited to the embodiments disclosed herein, as it can be implemented in various other forms. The disclosed embodiments are provided to fully disclose the invention to those skilled in the technical field to which the invention belongs. The same reference numerals throughout the specification denote the same components.

The terms used in this specification are merely used to describe specific embodiments and are not intended to limit the invention. Unless otherwise clear from the context, plural expressions encompass singular expressions. In this specification, terms such as "including" or "having" are intended to indicate the presence of the features, numbers, steps, operations, components, or sub-components as listed in this specification, rather than excluding the presence or possibility of one or more other features, numbers, steps, operations, components, or sub-components, or their combinations.

In this specification, terms such as "part," "module," "device," "terminal," "server," or "system" are intended to refer to hardware, software or a combination of both. For example, the hardware may be a data processing apparatus, including a CPU or other processor. Additionally, the software operated by the hardware may refer to running processes, objects, executables, threads of execution, programs, or similar entities.

Hereinafter, a detailed description of a preferred embodiment of the present invention will be provided with reference to the accompanying drawings.

FIG. 1 is a schematic diagram illustrating the configuration of an apparatus for identifying insect objects through learning according to some embodiment of the present invention.

The apparatus (100) is configured to include a control unit (110) that tracks the trajectory of bees and analyzes the collected pollen amount through a trajectory tracking module (120), object identifying module (125) and a pollen analyzing module (130), and a storage unit (150) that stores the trained data obtained by training various information about bees and pollen using a deep learning model.

It may further include a camera unit (140) for capturing the movement of bees near the beehive, a display unit (160)

for displaying the captured videos, and a communication unit (170) for performing wired or wireless communication with external devices.

If an external camera (not shown) is used instead of the built-in camera unit (140), the apparatus (100) can perform data transmission with the external camera through the communication unit (170). An external display device (not shown) can be used instead of the built-in display unit (160) of the apparatus (100), or it can be used in conjunction with the built-in display unit (160).

The apparatus of the present invention learns (or trains) the characteristics of insect, such as body structure, color distribution or pattern, using a deep learning model, and stores the trained data in the storage unit (150). It compares the streaming video data received from the camera unit (140) and then stored in the storage unit (150) with the trained data pre-stored in the storage unit (150) on a frame-by-frame basis to detect target insects in the video, track their movement paths, identify pollen, and analyze the amount of pollen.

Figure 2:
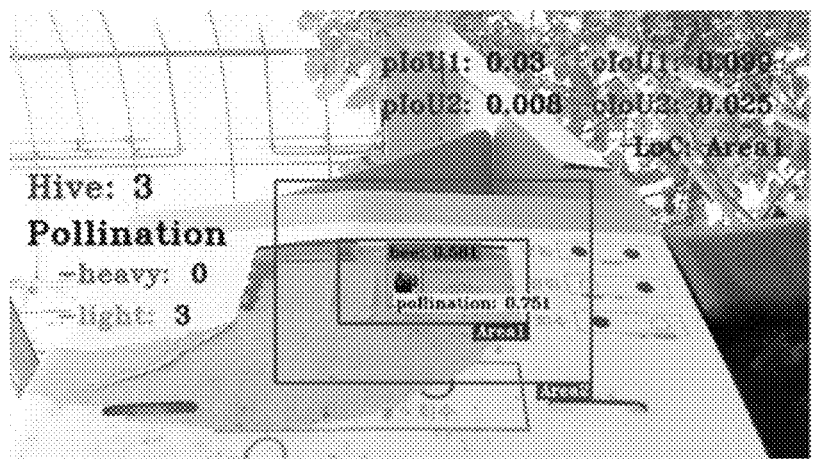
FIG. 2 is a screenshot obtained by the apparatus for identifying insect objects through learning according to some embodiment of the present invention.

FIG. 2 is a screenshot obtained by the apparatus for identifying insects through learning according to some embodiment of the present invention.

The display screen provided by the apparatus of the present invention may have a configuration shown in FIG. 2.

In general, the recognition of insect is performed by calculating the intersection over union (IoU) between a plurality of virtual square boxes (referred to as "gates") near the entrance of the beehive and square boxes for individual insects (referred to as "insect boxes") automatically drawn when they are recognized.

In FIG. 2, the gates are defined to distinguish Area 1 (i.e., inside the red gate), Area 2 (i.e., inside the blue gate), and Area 3 (i.e., outside the blue gate), and insect boxes (i.e., green boxes) are defined around the insects.

The apparatus of the present invention records or tracks the occurrence order of intersections between the gate's interior area and the insect box to distinguish whether the insect is entering or leaving the beehive.

For example, if the movement of the insect box (or the intersection between the insect box and the gate) is recorded in the order of Area 1→Area 2→Area 3, it indicates that the insect is leaving the beehive. If it is recorded in the order of Area 3→Area 2→Area 1, it indicates that the insect is entering the beehive. If the insect stays in Area 1 for a while and then disappears, it is considered to have entered the beehive.

In FIG. 2, "Hive" indicates the number of insects inside the beehive, which is calculated by counting the number of entries and exits of insects.

"Pollination" represents the amount of pollen collected by bees when the insects are bees, where "heavy" indicates sufficient pollen collection and "light" indicates relatively insufficient pollen collection.

"LoC" indicates in which area the insect (or insect box) is located.

On the other hand, the definition of IoU (Intersection over Union), which is a metric used to evaluate the accuracy of object detection in the present invention, is as follows.

$$IoU = \frac{\text{Intersection of the gate area and the bee box area}}{\text{Union of the gate area and the bee box area}}$$

The calculated intersection over union (IoU) values, 'pIoU1,' 'pIoU2,' 'cIoU1,' and 'cIoU2', are displayed on the upper right of the screen of FIG. 2. The prefixes 'p' and 'c' represent the past and current values, respectively.

'pIoU1' represents the value measured in the previous frame for Area 1 (i.e., inside the red gate), 'pIoU2' represents the value measured in the previous frame for Area 2 (i.e., inside the blue gate), 'cIoU1' represents the value measured in the current frame for Area 1, and 'cIoU2' represents the value measured in the current frame for Area 2, respectively.

In addition to IoU, other values such as 'Hive' and 'Pollination' are also updated for each frame of the video.

The recognition of insects and pollen is performed by comparing the captured video with the stored trained data. The probability of an object in the video, such as an insect or pollen, being identified as the insect or pollen can be represented numerically near the insect box or pollen box. For example, if the number '0.99' is displayed next to the insect box, it means that the object has a 99% probability of being identified (or predicted) as the target 'insect.'

The pollen box is generated within the insect box, and the numerical value displayed next to the pollen box represents the probability of the overlapping pollen image being predicted (or identified) as pollen. The pollen box generated outside the insect box shall be ignored.

The apparatus of the present invention can analyze the images in FIG. 2 to generate trajectory analysis charts of insects, as shown in FIGS. 3 to 6.

Figure 3:
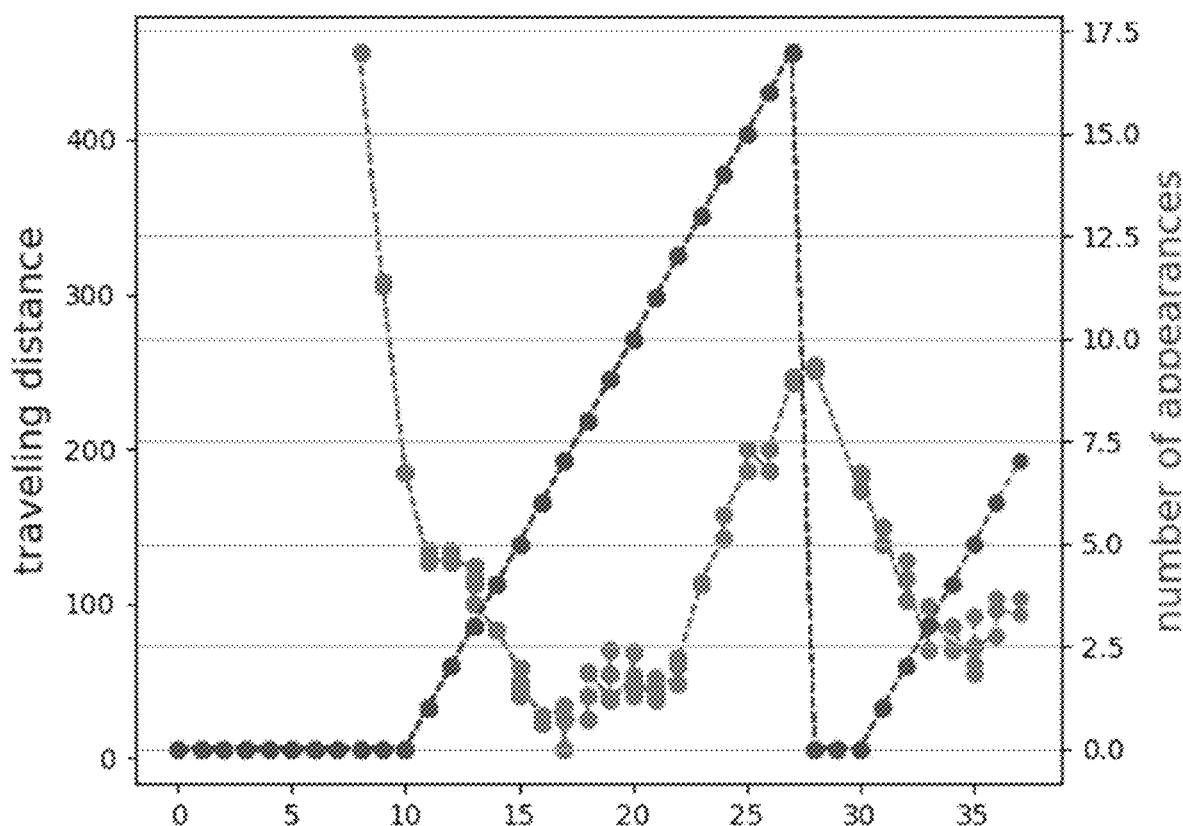
FIG. 3 is an analyzing diagram illustrating the insect's traveling distance and appearance frequency in the apparatus for identifying insect objects according to some embodiment of the present invention.

FIG. 3 is an analyzing diagram illustrating the insect's traveling distance and appearance frequency in the apparatus for identifying insect objects according to some embodiment of the present invention.

FIG. 3 is a trajectory chart showing the insect's traveling distance and appearance frequency (number of appearance). This allows for the understanding of the movements and status of insects by combining the trajectory line (blue), representing the traveling distance from the beehive's entrance to the insect box, and the appearance frequency line (red), representing the frequency of the insect box's appearance.

Figure 4:
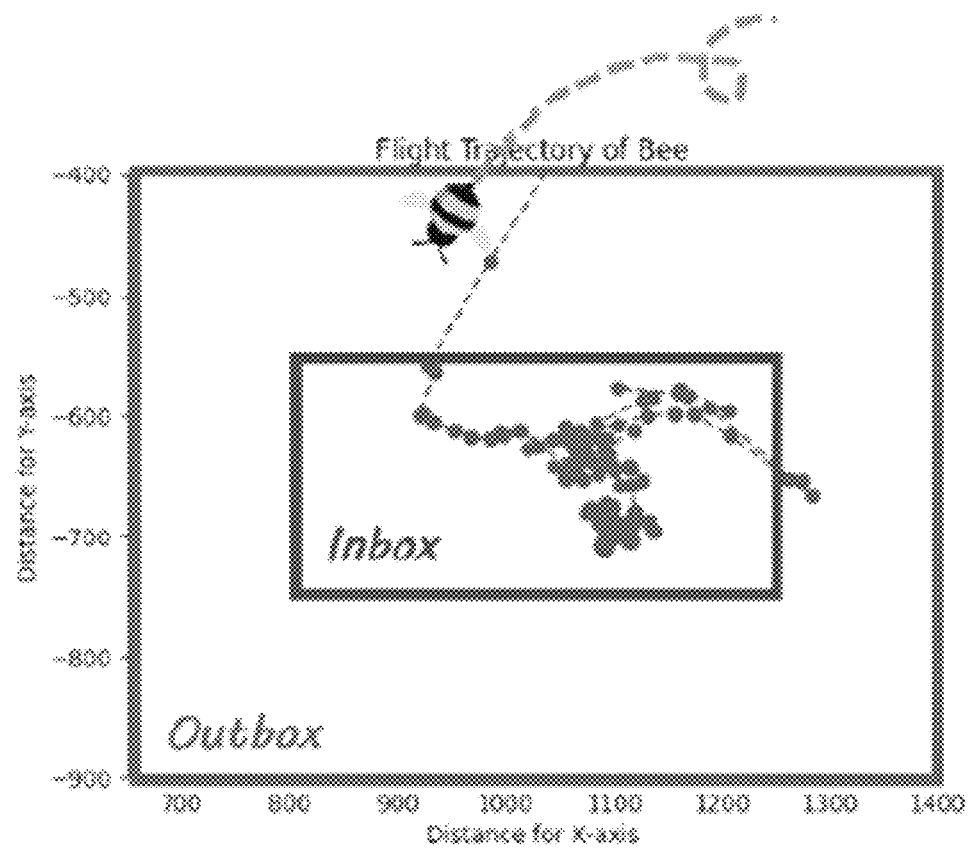
FIGS. 4 to 6 are exemplary diagrams analyzing bee's state using the apparatus for identifying insect objects according to some embodiment of the present invention.
Figure 5:
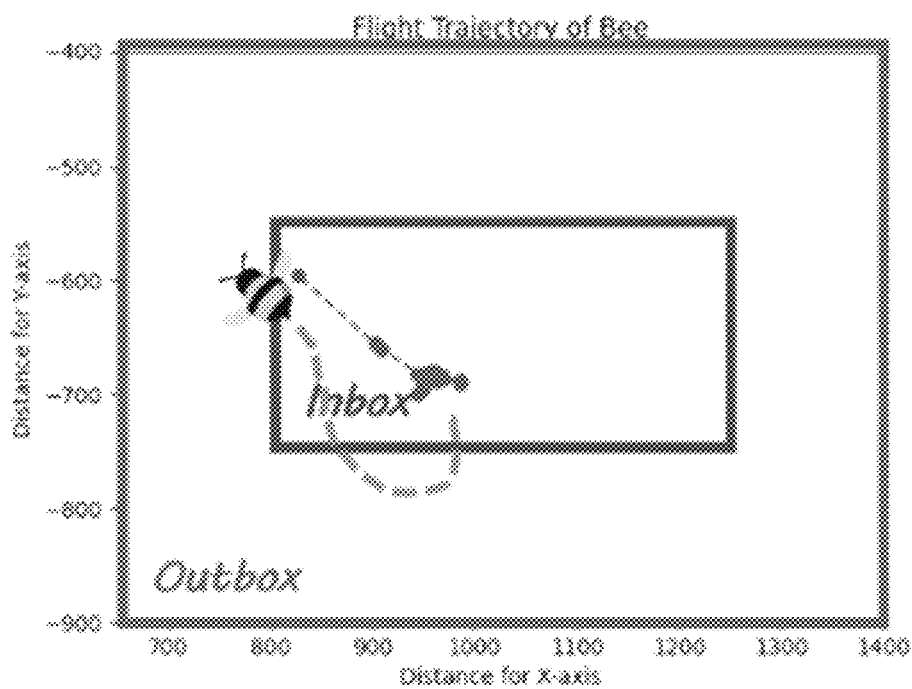
Figure 6:
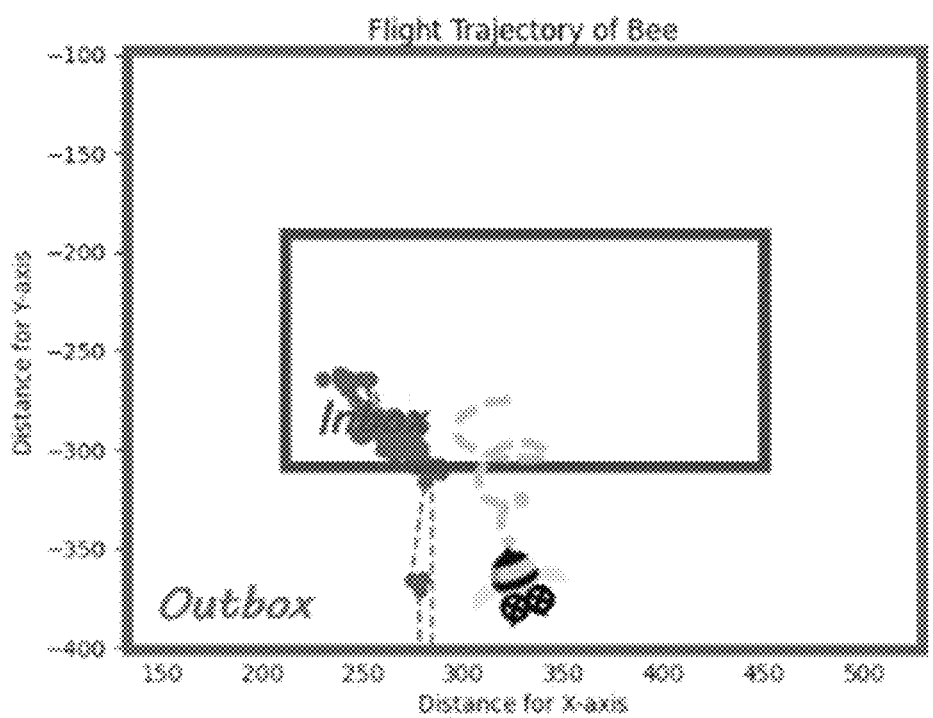

FIGS. 4 to 6 are exemplary diagrams showing the bee state analysis using the apparatus for identifying insect objects according to some embodiment of the present invention.

By comparing the three diagrams, one can accurately distinguish the case where bees fall and die around the entrance area, as shown in FIG. 6, in contrast to the normal trajectories of bees entering the beehive (in FIG. 4) and exiting the beehive (in FIG. 5).

Although not shown in the accompanying drawings, the apparatus of the present invention can provide various forms of bee status analysis. For instance, it can provide a graph depicting the bee's flight trajectory in the X-Y coordinate system ("Flight Trajectory of Bee"), a graph indicating the cumulative appearance frequency of the bee within the video ("Observation of Bee's Staying"), a graph showing the bee's traveling distance from a reference point ("Traveling Distance of Bee") and the bee's appearance status.

Moreover, the apparatus of the present invention can measure the time bees enter and leave the beehive, allowing us to assess aspects such as aging and the activity level of bees. It can also learn or train data regarding the shape and color of pollen. Thus, it can distinguish the color of pollen in captured videos to determine if bees are visiting the intended types of plants or other types of plants. It can also assess whether bee movements are normal or abnormal. This information can provide insights into environmental changes and the suitability of bee foraging activities and assist in beehive and greenhouse management.

Hereinafter, the methods for identifying each insect object will be explained in detail.

Figure 7A:
FIGS. 7a and 7b are schematic diagrams illustrating honeybee identification methods in the apparatus according to some embodiment of the present invention.
Figure 7B:
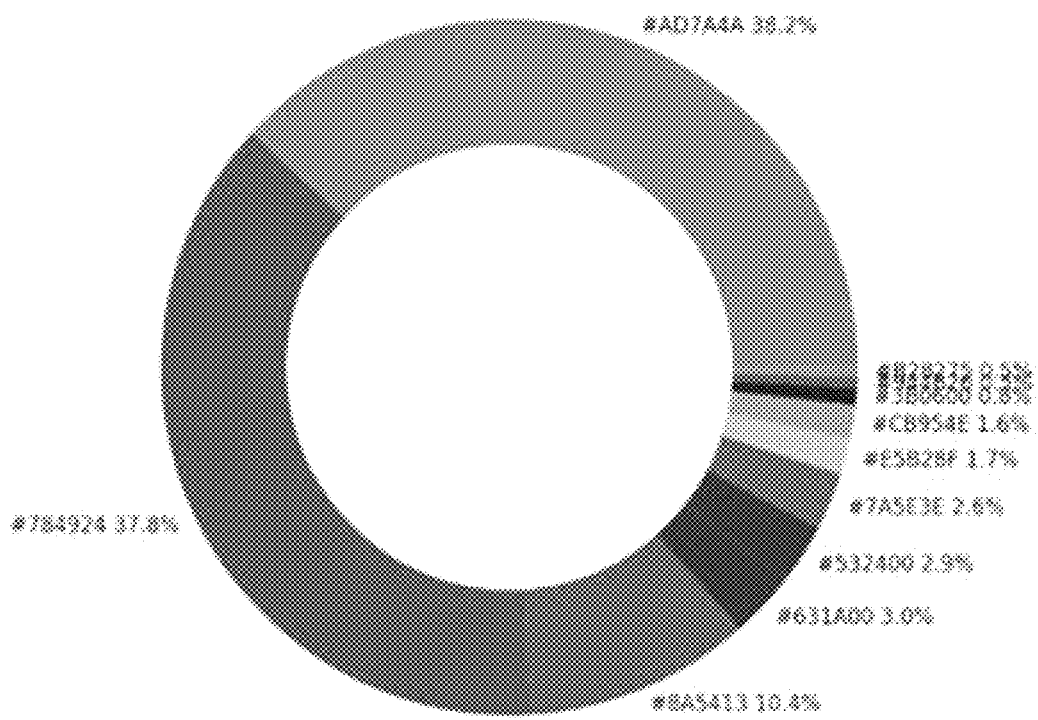
Figure 8A:
FIGS. 8a and 8b are schematic diagrams illustrating bumblebee identification methods in the apparatus according to some embodiment of the present invention.
Figure 8B:
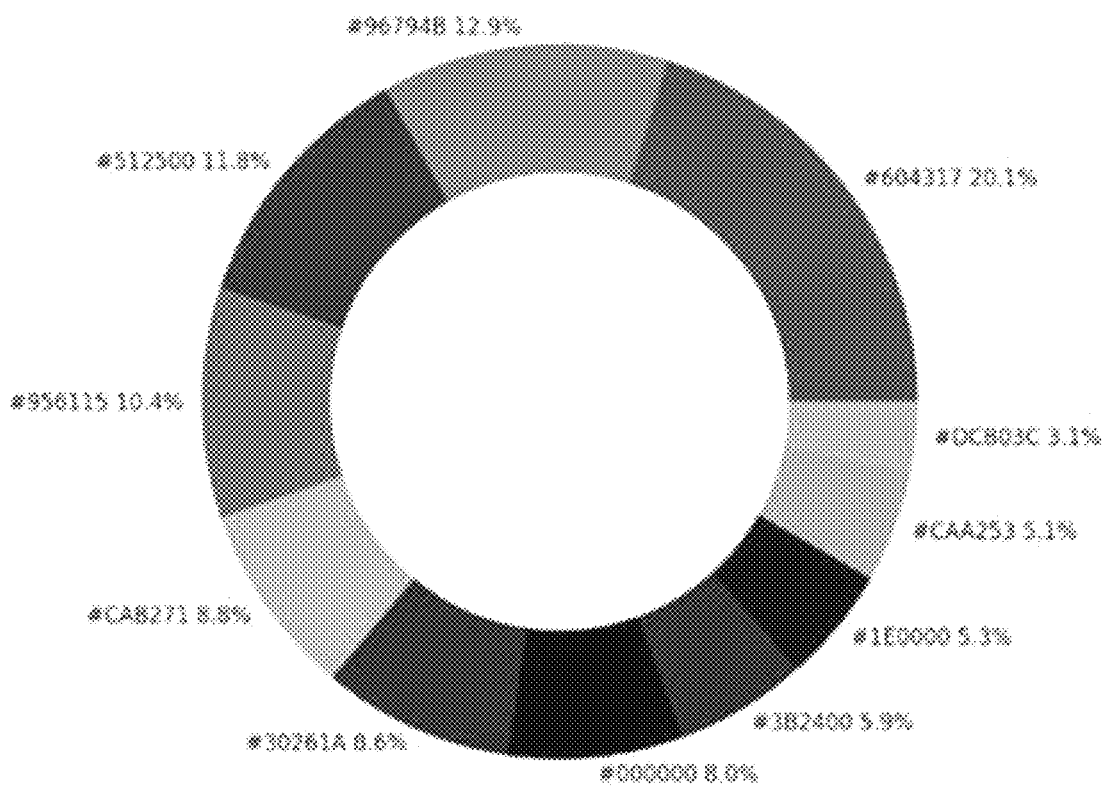

FIGS. 7a and 7b are schematic diagrams illustrating honeybee identification methods in the apparatus according to some embodiment of the present invention, and FIGS. 8a and 8b are schematic diagrams illustrating bumblebee identification methods in the apparatus according to some embodiment of the present invention.

Classification tasks using deep learning-trained data can be applied in various fields as long as there is data of sufficient quality for learning. However, the core of the present invention lies not only in simple learning/prediction but also in the classification of objects through algorithms.

This introduces a new methodology in terms of improving and enhancing predictive models. When training the deep learning model with training images of various insect objects such as honeybees and bumblebees, the annotations (class types: honeybee, bumblebee, hornet, pollen, other objects) and their characteristics (e.g., shape, color distribution) of the object images are learned together. The accuracy of the model can be calculated based on the class-specific characteristics learned from the images.

Even though it is possible to achieve the best quality results by accurate training and prediction for the entire captured video, it requires handling a large amount of data and considering the performance and efficiency of the computer. To address this issue, a method of annotating only the object requiring identification is used. The apparatus of the present invention is designed to show high efficiency even with relatively low computing performance by training only the representative characteristics of each object or class instead of comprehensive training for each object.

FIG. 7a is a captured image of a honeybee, and FIG. 8a is a captured image of a bumblebee.

The basic structure of the two bees is similar, but there are differences in the shape and distribution of color patterns in the abdomen. Honeybees have a rounded abdomen with complex color pattern, while bumblebees have a thick abdomen with simple color patterns. These characteristics are sufficient criterion for classifying the two species, and the results of the color analysis for them are shown in FIGS. 7b and 8b.

FIG. 7b and FIG. 8b represent the color pattern of the abdomen of honeybees and bumblebees, respectively. These two objects are very similar, making it inappropriate to use conventional methods for differentiation. Morphologically, bumblebees are relatively larger than honeybees, but it cannot serve as a criterion because the characteristics (shape, color distribution) change depending on the habitat. Therefore, a classification technique based on the color distribution of the pattern, especially in the abdomen, is necessary for differentiating honeybees and bumblebees. Comparing FIG. 7b and FIG. 8b, it can be observed that the color distribution in bumblebees is relatively evenly distributed and appears simple (see FIG. 8b), while honeybees have multiple colors representing a complex and detailed pattern in the narrow region occupying less than 10% of the total areas (see FIG. 7b). Therefore, by jointly learning the color distribution of the pattern on the abdomen along with the shape, the accuracy of the model for predicting the honeybees and bumblebees can be improved.

On the other hand, the size of normal bees, including honeybees and bumblebees, is generally small, ranging from 15 mm to 20 mm, and their complex and intricate structures make recognition very difficult. Especially, the shadow caused by the hair covering the entire body of bumblebees makes recognition even more challenging. To solve this problem, the present invention further includes the process of tracking and investigating the trajectory of the objects to obtain relevant data and combining it with the characteristics of objects to perform various prediction tasks. By applying such trajectory tracking technology to the discrimination algorithm of objects, the accuracy of object recognition can be improved.

Figure 9A:
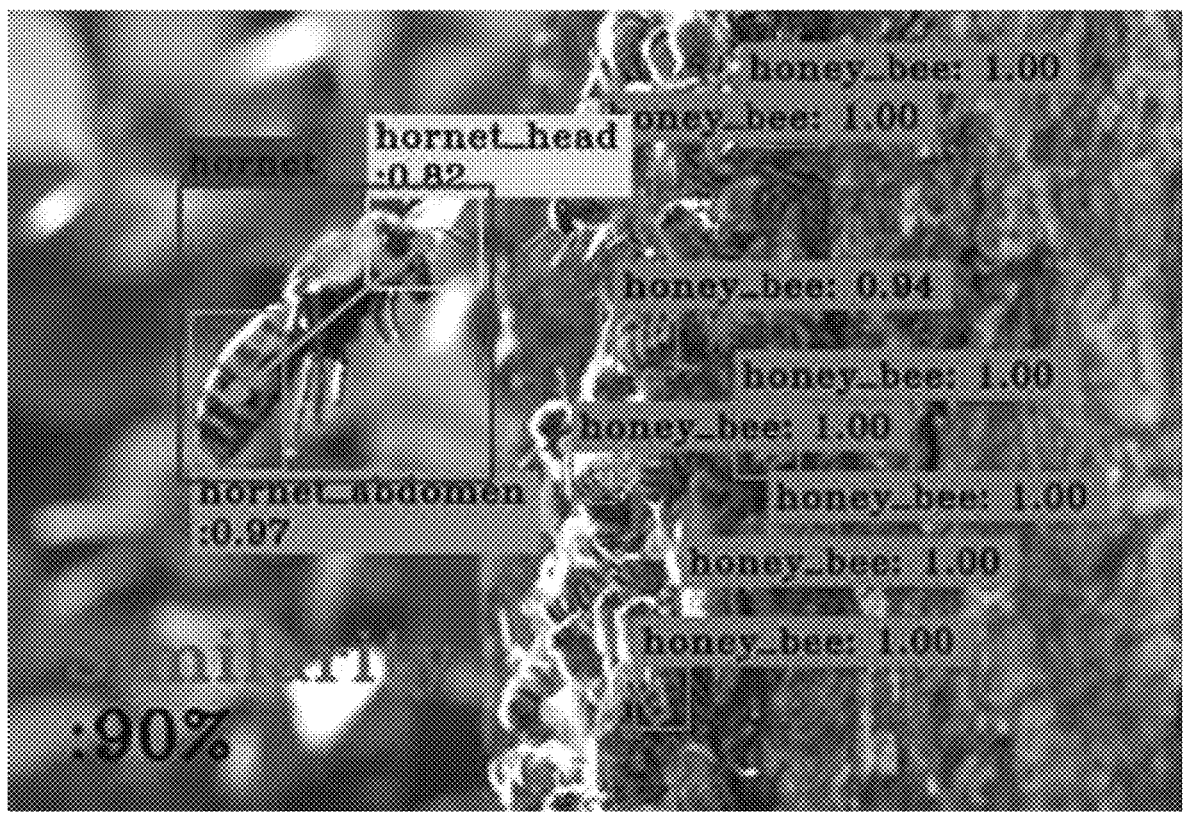
FIGS. 9a and 9b are schematic diagrams illustrating hornet identification methods in the apparatus according to some embodiment of the present invention.
Figure 9B:
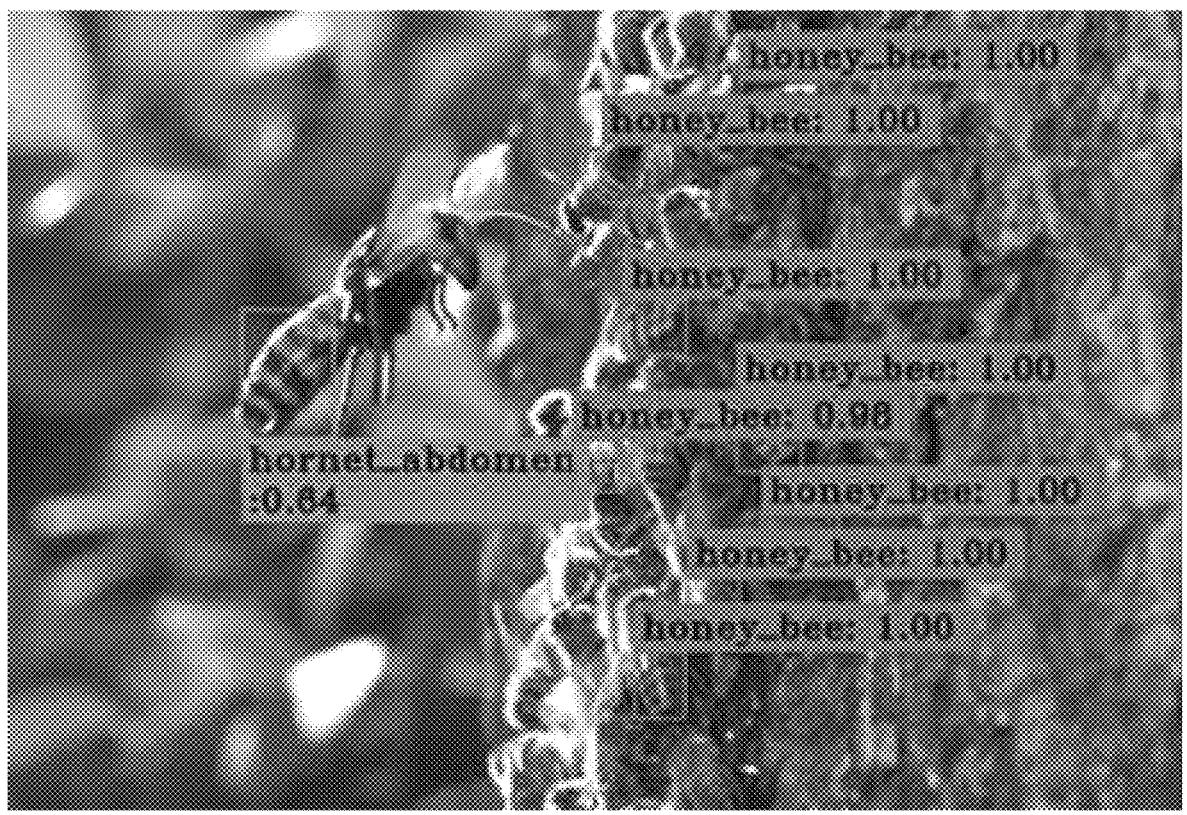

FIGS. 9a and 9b are schematic diagrams illustrating hornet identification methods in the apparatus according to some embodiment of the present invention.

When two different objects show significant differences in their shape, a new approach is needed. Hornets, for example, exhibit structural differences from normal insect objects, such as honeybees and bumblebees. The large and distinct shape and color of hornets make them suitable to be distinguished from other insect objects. Hornets are generally characterized by their large size, clear differentiation of body parts, and a distinct pattern on their abdomen, which consists of a dark yellow color and clean black markings. To utilize these characteristics, a technique for classifying hornets is developed by separately training the head and abdomen of hornets and investigating the distance between them.

FIGS. 9a and 9b represent the results predicted using data trained on honeybees (honey_bee) and the head of hornets (hornet_head), as well as the abdomen of hornets (hornet_abdomen).

As mentioned above, the color distribution pattern on the abdomen is a characteristic feature of honeybees. Therefore, the predicted bee boxes (in blue) for honeybees appear in the abdomen of honeybees on both FIGS. 9a and 9b. However, this is just an example, and it is also possible to form a honeybee box that span the entire body of a honeybee.

In FIG. 9a, the head and abdomen parts of hornets are predicted separately and displayed with the respective boxes. When both the head box and abdomen box of a hornet are detected, the Euclidean distance between the two boxes is calculated, and the similarity with stored hornet data is examined. The distances between the boxes are calculated, and the lines connecting the boxes are shown in light blue. The accuracy of object identification is improved by analyzing the statistics of the accumulated values.

It should be noted that even the same object may appear different in size depending on the distance from the camera and the shooting angle. Therefore, calibration considering these factors is necessary. In the present invention, a method of obtaining statistics by using both direct measurements of real objects near the shooting location and average values of real objects is applied to compensate for this.

In order to perform such calculations, both the head and abdomen boxes of hornets must be identified as a result of the prediction. That is, if only the head or abdomen of a hornet is identified due to low-quality input data, it may not be classified as a hornet.

FIG. 9b represents a case where only the abdomen of a hornet is identified, and the head is not recognized. This is because the head and wings of the hornet overlap during flight, causing incorrect recognition. Although the object is not recognized due to an unexpected situation, the possibility can still be calculated by comparing it with the results of the previous frames.

FIGS. 10a, 10b, 11a, and 11b illustrate diagrams explaining a 3D distance measurement method utilizing the morphological information of insects used in the apparatus according to some embodiment of the present invention.

The "3D distance measurement method" is closely related to the ecological behavioral characteristics of insects and provides highly accurate results. Most insects, including bees, have joints that restrict their movements, resulting in distinctive behavioral characteristics.

Insects such as bees have distinct anatomical segments of body and articulated joints, allowing them to have a limited range of motion. Thus, it is possible to quickly detect any movements outside that range. Applying this principle to the prediction model allows for the detection and removal of singularities, increasing the accuracy of predictions. Of course, if mollusks like earthworms also have multiple joints, their behavioral characteristics can be identified, and the application of the technology of the present invention would be possible.

Figure 10A:
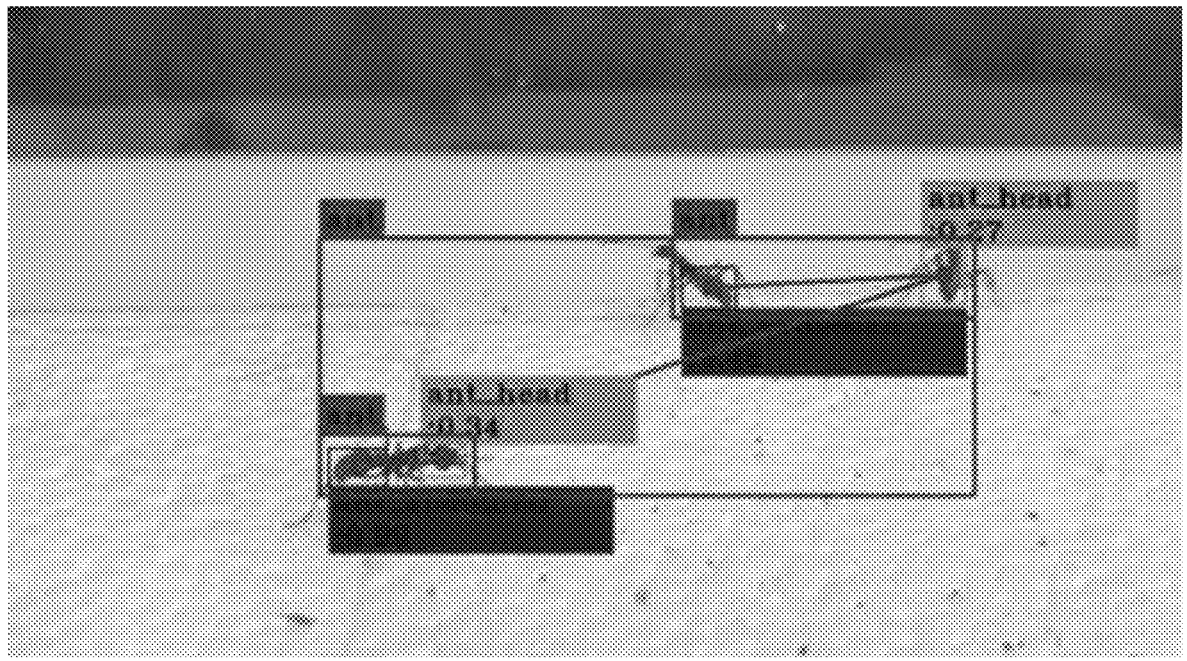
FIGS. 10a, 10b, 11a, and 11b are schematic diagrams illustrating a 3D distance measurement method using morphological information of insects used in the apparatus according to some embodiment of the present invention.

FIG. 10a is the result without applying the "3D distance measurement method." If we differentiate the process of object identification into object detection and object recognition, we can say that object detection was successful, but object recognition failed. The basic algorithm to detect ant objects by finding the ant's head and abdomen worked correctly. However, with the detection of another ant object, it mistakenly recognized the two objects as a new entity by connecting them. To prevent such cases, an algorithm is needed to remove incorrect predictions by using the size of the object calculated using the "3D distance measurement method."

Figure 10B:
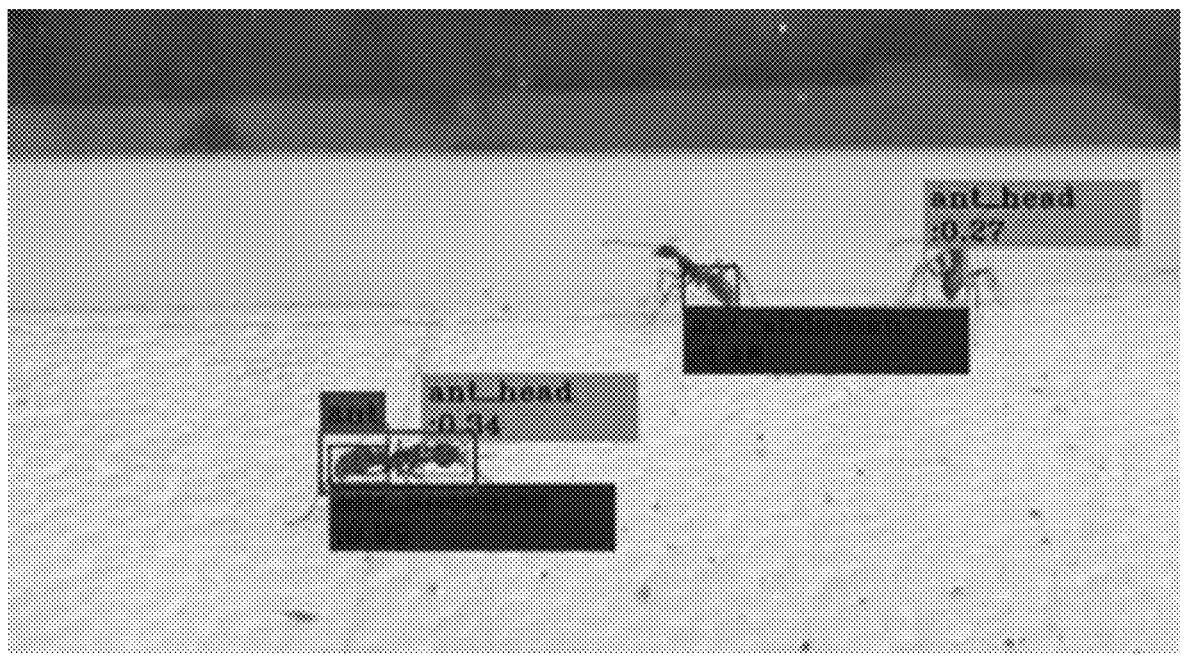

FIG. 10b is the result with the application of the "3D distance measurement method." In the case of the two ants in the distance at the back in FIG. 10b, the middle ant had only the abdomen detected, and the ant on the right had the entire body misidentified as the head, indicating incomplete recognition and prediction. Therefore, these two objects (i.e., the middle ant and the ant on the right) are considered non-existent entities from a morphological perspective of ants, and they should be excluded from the predictions. Ultimately, only for successful identification, like the front ant, when the head and abdomen are detected together and the calculated distance is similar to the statistical size of ants, it should be predicted as an ant.

Figure 11A:
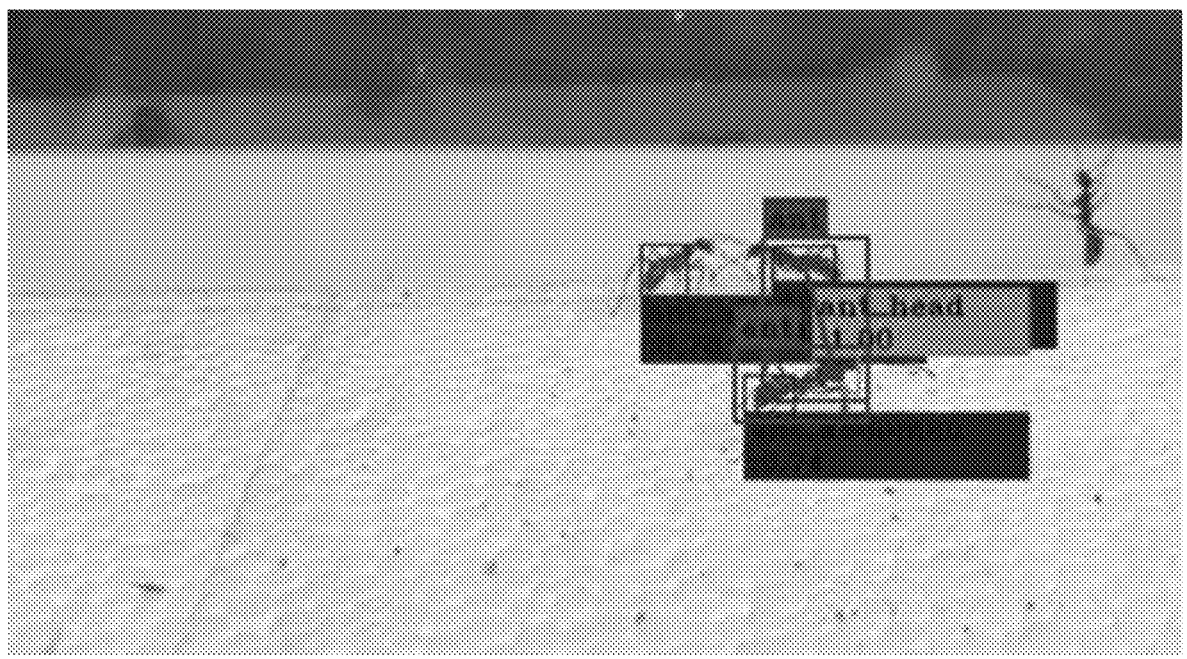

FIG. 11a represents a case where multiple objects are densely packed in close proximity, without applying the "3D distance measurement method."

There are a total of four ants in the video, but the distance between the two ants vertically aligned in the middle is close, so the abdomen of the upper ant and the head of the lower ant are connected by a purple line, falsely predicting them as a single ant object.

Figure 11B:
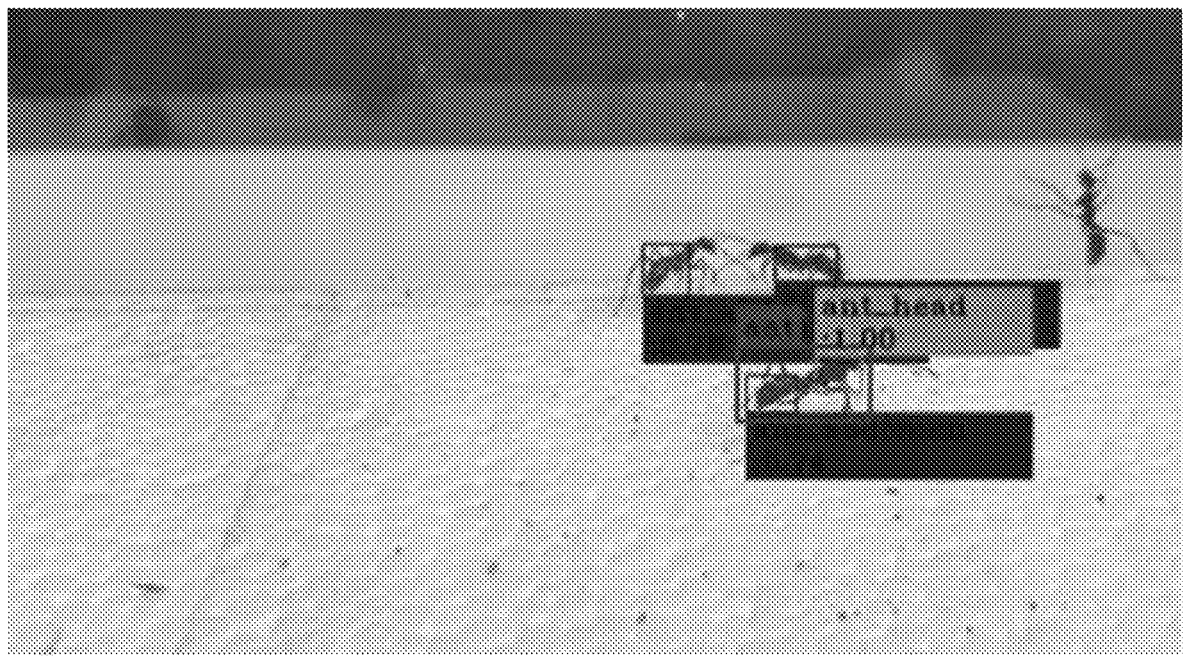

FIG. 11b is the same video as FIG. 11a, but with the application of the "3D distance measurement method."

The results obtained using the "3D distance measurement method" are represented in pixel values on the screen. After converting these values into distances, they are compared with the statistical size of the objects. This allows for the detection of whether an object is normal or abnormal. The DPI (dots per inch) represents the resolution of a digital image and refers to the number of pixels within one (1) inch. For example, with DPI96, there would be 37.79 pixels in one (1) cm (1/2.54×96=37.79). By reverse calculation, we can determine that the distance of one (1) pixel is 0.0263 cm. By calculating the number of pixels from the ant's head to its abdomen in FIG. 11b, an average of 138 pixels (~3.6 cm) can be obtained. Using the average size of ants (worker ant: 3 mm, queen ant: 7 mm) as classification criteria, only the lower ants should be predicted as normal objects, and the entities recognized by connecting the abdomen of the upper ant with the head of the lower ant should be removed from the predictions.

Figure 12:
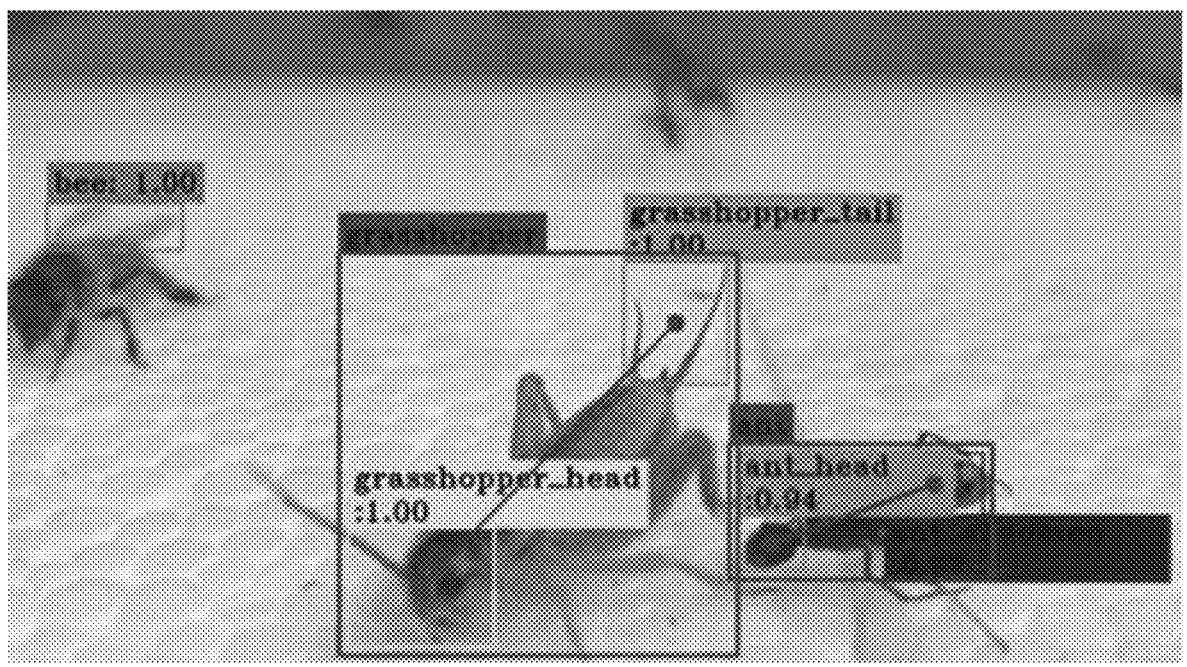
FIGS. 12 and 13 are diagrams illustrating the application of insect identification methods using morphological information of insects to various objects according to some embodiments of the present invention.
Figure 13:
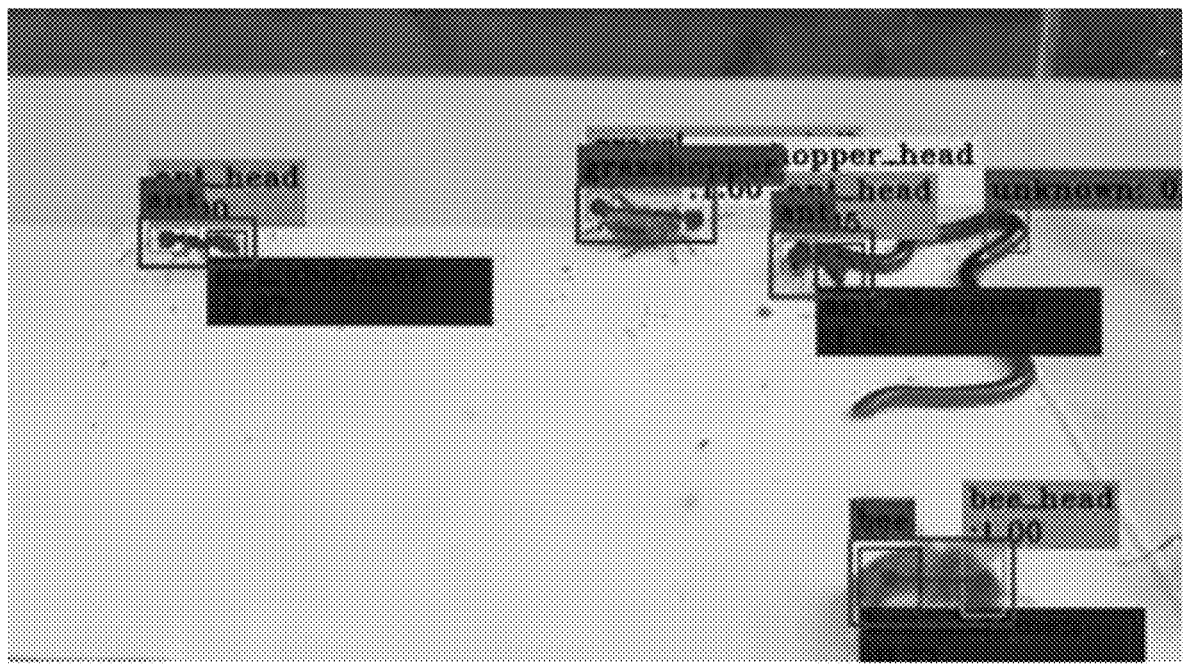

FIGS. 12 and 13 are diagrams illustrating the application of insect identification methods using morphological information of insects to various objects according to some embodiments of the present invention.

In FIG. 12, the grasshopper's head and tail were identified as its classes and the characteristics of the classes were trained. The ant's head and abdomen were considered as its classes and the characteristics thereof were trained. The bee's wings, which are distinct from other objects, were considered as its class and trained as its characteristics. Characteristics training is highly subjective, requiring a lot of expertise and experience for efficient classification.

For example, in FIGS. 7 and 8, to distinguish between honeybees and bumblebees, the pattern on the abdomen of bees was trained as characteristics. However, in FIG. 9, using the morphological features of hornets that are distinct from honeybees and bumblebees, the head and abdomen of hornets were trained as separate classes, and the distance between them was calculated. In FIG. 12, the wings of bees, which are suitable for distinguishing them from ants and grasshoppers, are trained as class characteristics. Thus, different classes and characteristics can be introduced for the same object depending on the situation.

However, in FIG. 12, due to the high similarity between the heads of grasshoppers and ants, it becomes difficult to distinguish between them depending on the shooting direction of the video. In other words, if ants and grasshoppers are placed in the same direction, it becomes challenging to differentiate between them. Therefore, it is necessary to predict the objects by utilizing both the "3D distance measurement method" and the morphological information of insect objects, as described in the present invention.

The "3D distance measurement method" developed for object classification does not simply calculate the Euclidean distance between points. It calculates the 3D distance using 2D data, thereby improving detection efficiency with low performance.

FIG. 13 illustrates the results of identifying and predicting various objects, including earthworms, using the "3D distance measurement method" and morphological information of insects simultaneously.

Each organism is predicted by identifying the distinctive characteristics of the target classes. If a non-targeted object, such as an earthworm, is recognizable, it can be classified as an "unknown" category.

Moreover, when understanding the 2D image of FIG. 13 in a 3D context, we can observe distortions caused by spatial information, such as the inclination of the plane between the upper and lower objects and perspective distortions. In other words, when multiple objects are positioned on different planes, it is necessary to correct the distortions to identify them accurately by applying spatial information and the morphological characteristics of the objects.

Figure 14:
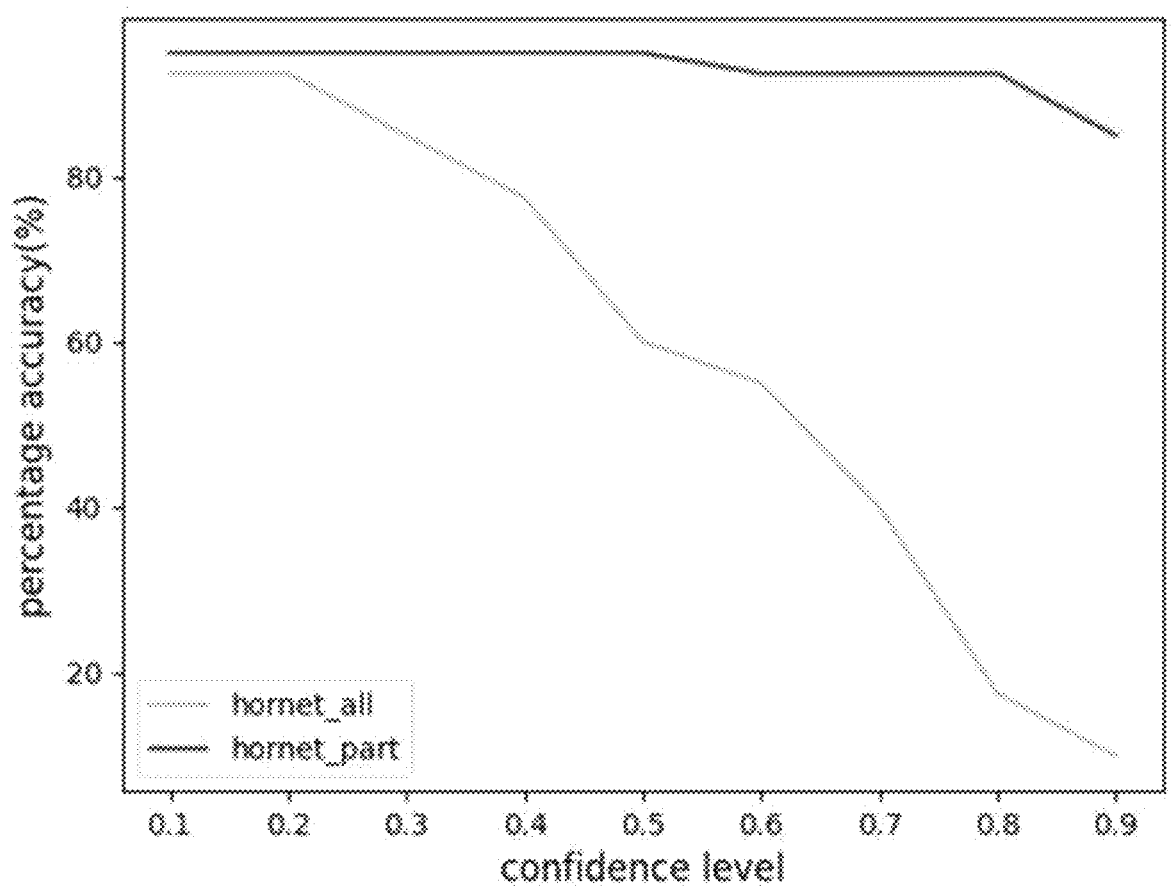
FIG. 14 is a diagram illustrating the performance of the 3D distance measurement method using morphological information of insects according to some embodiment of the present invention.

FIG. 14 is a diagram illustrating the performance of the 3D distance measurement method using morphological information of insects according to some embodiment of the present invention.

In FIG. 14, the results of experiments conducted on hornets are presented. The confidence level represents the level at which the trained data estimates the presence of hornets, and the percentage accuracy indicates the ratio of correct answers regarding whether it is an actual hornet, divided by the total number of frames.

Comparing the results between training the overall morphology of hornets as a single characteristic (hornet_all) and training the head and abdomen separately and considering morphological characteristic such as the distance between them (hornet_part), it can be observed that the accuracy is much higher when training the individual body parts of hornets as characteristics.

When training the overall morphology of hornets, the accuracy significantly decreases when the confidence level is increased, due to image quality, background noise, and other factors. On the other hand, when training the head and abdomen separately and considering other morphological characteristics, such as the distance between them, the accuracy is maintained, and it is possible to achieve an accuracy of over 85% even with a confidence level of 90%.

Although not explicitly shown in the drawings, it is observed that training the individual characteristics of objects and considering the morphological characteristics of insects, as described in this invention, results in more than an eight-fold improvement in performance within the 90% confidence level range compared to training the overall morphology of the objects. Even in low-resolution tests, there was a difference of over 40% in accuracy between the two cases, and insects could be relatively accurately detected even within the 70% confidence level range.

Although not explicitly shown in the drawings, it is possible to include additional means of opening and closing the entrance of the hive (e.g., a beehive for insects such as bees) and incorporate a mechanism to operate the opening and closing means when identifying designated abnormal objects such as hornets, grasshoppers, and ants, rather than honeybees or bumblebees.

Furthermore, when identifying abnormal objects, in addition to or together with the operation of the opening and closing means, it is possible to generate specific signals such as sound for alerting the user, illuminate lamps, and transmit information to the user terminal using communication means.

The embodiments and specific details described above are provided to facilitate a better understanding of the present invention. However, the present invention is not limited to these embodiments and can be subject to various modifications and variations by those skilled in the art based on their ordinary knowledge in the technical field to which the present invention belongs.

Therefore, the scope of the present invention should not be limited to the described embodiments but should encompass all modifications and variations that are within the scope of the principles disclosed in this specification.

The invention claimed is:

1. An apparatus for identifying insect objects through learning, the apparatus comprising:
   a storage unit configured to store trained data obtained by training morphological characteristics of target insect objects using a deep learning model; and
   a control unit configured to identify the target insect objects using a captured video and the trained data and to track a trajectory of the target insect objects that are identified,
   wherein the deep learning model is configured to classify the morphological characteristics of the target insect objects into multiple classes and to learn characteristics of each of the multiple classes,
   wherein the control unit is configured to identify each of the target insect objects by utilizing distance measurement results between the multiple classes of each of the target insect objects and the morphological characteristics of the target insect objects stored in the storage unit,
   wherein when the target insect objects are honeybees and bumblebees, the deep learning model is configured to define the multiple classes including a class of abdomen sections of honeybees and bumblebees and to train patterns and distribution of colors in the abdomen sections as characteristics representing the class.

2. An apparatus for identifying insect objects through learning, the apparatus comprising:
   a storage unit configured to store trained data obtained by training morphological characteristics of target insect objects using a deep learning model; and
   a control unit configured to identify the target insect objects using a captured video and the trained data and to track a trajectory of the target insect objects that are identified,
   wherein the deep learning model is configured to classify the morphological characteristics of the target insect objects into multiple classes and to learn characteristics of each of the multiple classes,
   wherein the control unit is configured to identify each of the target insect objects by utilizing distance measurement results between the multiple classes of each of the target insect objects and the morphological characteristics of the target insect objects stored in the storage unit,
   wherein when abnormal insect objects are hornets, the deep learning model is configured to define the multiple classes including a first class of head sections of the hornets and a second class of abdomen sections of the hornets, the deep learning model being configured to train patterns and distribution of colors in the abdomen sections as well as a distance between each of the head sections and each of the abdomen sections as characteristics representing the first class and the second class.

3. An apparatus for identifying insect objects through learning, the apparatus comprising:
   a storage unit configured to store trained data obtained by training morphological characteristics of target insect objects using a deep learning model; and
   a control unit configured to identify the target insect objects using a captured video and the trained data and to track a trajectory of the target insect objects that are identified,
   wherein the deep learning model is configured to classify the morphological characteristics of the target insect objects into multiple classes and to learn characteristics of each of the multiple classes,
   wherein the control unit is configured to identify each of the target insect objects by utilizing distance measurement results between the multiple classes of each of the target insect objects and the morphological characteristics of the target insect objects stored in the storage unit,
   wherein when abnormal insect objects are ants, the deep learning model is configured to define the multiple classes including a first class of head sections of the ants and a second class of abdomen sections of the ants, the deep learning model being configured to train shape and color distribution of the abdomen sections as well as a distance between each of the head sections and each of the abdomen sections as characteristics representing the first class and the second class.

4. An apparatus for identifying insect objects through learning, the apparatus comprising:
- a storage unit configured to store trained data obtained by training morphological characteristics of target insect objects using a deep learning model; and
- a control unit configured to identify the target insect objects using a captured video and the trained data and to track a trajectory of the target insect objects that are identified,
- wherein the deep learning model is configured to classify the morphological characteristics of the target insect objects into multiple classes and to learn characteristics of each of the multiple classes,
- wherein the control unit is configured to identify each of the target insect objects by utilizing distance measurement results between the multiple classes of each of the target insect objects and the morphological characteristics of the target insect objects stored in the storage unit,
- wherein when abnormal insect objects are grasshoppers, the deep learning model is configured to define the multiple classes including a first class of head sections of the grasshoppers and a second class of tail sections of the grasshoppers, the deep learning model being configured to train shape of the tail sections as well as a distance between each of the head sections and each of the tail sections as characteristics representing the first class and the second class.

5. The apparatus of claim 2,
- wherein the control unit is configured to correct image distortions in the captured video caused by spatial distance using information of the spatial distance and information of the morphological characteristics of the target insect objects.

6. An apparatus for identifying insect objects through learning, the apparatus comprising:
- a storage unit configured to store trained data obtained by training morphological characteristics of target insect objects using a deep learning model; and
- a control unit configured to identify the target insect objects using a captured video and the trained data and to track a trajectory of the target insect objects that are identified,
- wherein the deep learning model is configured to classify the morphological characteristics of the target insect objects into multiple classes and to learn characteristics of each of the multiple classes,
- wherein the control unit is configured to identify each of the target insect objects by utilizing distance measurement results between the multiple classes of each of the target insect objects and the morphological characteristics of the target insect objects stored in the storage unit,
- wherein the control unit is configured to define multiple areas of different sizes centered around an entrance of a beehive in the captured video and to define an insect box around an area where each of the target insect objects is identified.

7. The apparatus of claim 6,
- wherein the control unit is configured to distinguish an entry and an exit of each of the target insect objects based on an order of overlapping between the multiple areas and the insect box.

8. The apparatus of claim 6,
- wherein the trained data includes data related to morphological characteristics of pollen, and the control unit is configured to analyze a quantity of the pollen using captured images of the pollen and the morphological characteristics of the pollen included in the trained data.

9. The apparatus of claim 8,
- wherein the control unit is configured to define a pollen box around the pollen identified in the captured video, the pollen box being defined only within the insect box.

10. The apparatus of claim 6,
- wherein the trained data includes data related to morphological characteristics of abnormal insect objects, and the control unit is configured to analyze a presence of the abnormal insect objects using images of the abnormal insect objects in the captured video and the morphological characteristics of the abnormal insect objects included in the trained data.

11. The apparatus of claim 6, further comprising:
- a camera unit configured to capture the video; and
- a display unit configured to display the captured video,
- wherein the control unit is configured to define an object identification box around each of the target insect objects that are identified and to display the object identification box on the display unit.

12. The apparatus of claim 11,
- wherein the control unit is configured to display lines connecting between the multiple classes of the target insect objects on the display unit.

13. The apparatus of claim 10, further comprising:
- a means for opening and closing the entrance of the beehive,
- wherein the control unit is configured to operate the means when the abnormal insect objects are identified.

14. The apparatus of claim 10,
- wherein the control unit is configured to generate a signal when the abnormal insect objects are identified.

* * * * *